United States Patent

Koumura et al.

[11] Patent Number: 5,991,870
[45] Date of Patent: *Nov. 23, 1999

[54] PROCESSOR FOR EXECUTING AN INSTRUCTIONS STREAM WHERE INSTRUCTION HAVE BOTH A COMPRESSED AND AN UNCOMPRESSED REGISTER FIELD

[75] Inventors: Yasuhito Koumura, Tokyo; Hiroki Miura, Warabi; Kenshi Matsumoto, Koshigaya, all of Japan

[73] Assignee: Sanyo Electric Co., Ltd., Moriguchi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/710,260

[22] Filed: Sep. 13, 1996

[30] Foreign Application Priority Data

Nov. 30, 1995 [JP] Japan ................................ 7-313146

[51] Int. Cl.$^6$ ................................ G06F 9/30; G06F 9/00
[52] U.S. Cl. ................................ 712/208; 712/216
[58] Field of Search ................................ 395/384, 388; 711/212, 214, 215, 220; 712/208, 212, 216–217

[56] References Cited

U.S. PATENT DOCUMENTS

| | | | |
|---|---|---|---|
| 5,197,132 | 3/1993 | Steely, Jr. et al. | 395/393 |
| 5,233,695 | 8/1993 | Miyoshi | 395/388 |
| 5,581,721 | 12/1996 | Wada et al. | 395/376 |
| 5,644,746 | 7/1997 | Holt et al. | 712/217 |
| 5,655,132 | 8/1997 | Watson | 395/674 |
| 5,684,983 | 11/1997 | Ando | 395/566 |
| 5,729,723 | 3/1998 | Wada et al. | 395/563 |
| 5,748,515 | 5/1998 | Glass et al. | 708/525 |
| 5,784,589 | 7/1998 | Bluhm | 712/217 |
| 5,794,010 | 8/1998 | Worrell et al. | 395/500.41 |
| 5,796,970 | 8/1998 | Higaki etal. | 712/200 |
| 5,889,983 | 3/1999 | Mittal et al. | 712/223 |
| 5,890,222 | 3/1999 | Agarwal et al. | 711/220 |
| 5,896,519 | 4/1999 | Worrell | 712/213 |
| 5,897,665 | 4/1999 | Padwekar | 711/212 |
| 5,903,919 | 5/1999 | Myers | 711/220 |

OTHER PUBLICATIONS

Mano, M., "Digital Design," 2nd ed., Prentice–Hall, pp. 180–186, 1991.

Hennessy, J., et al., Computer Architecture: A Quantitative Approach, 2nd ed., Morgan Kaufmann, pp. 375–384, 439–47, Aug. 1995.

"A Quantitative Approach for Design, Realization and Evaluation of Computer Architecture," John L. Hennessey and David A. Patterson, Computer Architecture: A Quantitative Approach, Dec. 1992, Section 2E, pp. 728–730.

"Hitachi Single–Chip RISC Microcomputer SH7000/SH7600 Series Programming Manual," Hitachi Ltd., Mar. 1993, pp. 12–13 and 29.

*Primary Examiner*—Zarni Maung
*Assistant Examiner*—Andrew Caldwell
*Attorney, Agent, or Firm*—Armstrong, Westerman, Hattori, McLeland & Naughton

[57] ABSTRACT

A processor that executes an instruction stream having at least one compressed register field allows for smaller programs and greater processing speed. The instructions have at least one n-bit register number field and at least one m-bit register code field, where n is less than m. The n-bit register number field is capable of designating any register in a set of working registers. The m-bit register code field is capable of designating any register of a subset of the working registers. The m-bit register code may designate a source or destination register of the current instruction, a source or destination register of the last instruction, or a destination register of the second to last instruction. An instruction fetch section of the processor fetches the instruction words from memory. As part of the instruction decoding process, the m-bit register code field is passed to a register designation code conversion, or register mapping, section where the m-bit register code is converted into an n-bit register number. Various embodiments of the register mapping section include: (1) a fixed mapping such that identical inputs always cause identical outputs; (2) a conversion table in which all or part of the table's content may be updated by execution of either a special or regular instruction.

16 Claims, 5 Drawing Sheets

INSTRUCTION FOR OPERATION AMONG REGISTERS

INSTRUCTION FOR OPERATION AMONG REGISTERS

PROCESSOR FOR EXECUTING AN INSTRUCTIONS STREAM WHERE INSTRUCTION HAVE BOTH A COMPRESSED AND AN UNCOMPRESSED REGISTER FIELD

BACKGROUND OF THE INVENTION

1. Field of the Invention:

The present invention relates to a data processing device which has a plurality of working registers, and, in particular, to a data processing device which employs a stored program method.

2. Description of the Related Art:

A data processing device having a plurality of general registers called working registers can be characterized by the number of register operands which one instruction can designate. For instance, in a conventional RISC architecture, three registers can be designated with a typical operation instruction. Two of them are used as a source register for supplying two values to be added in an addition instruction, and the other one is used as a destination register for storing the operation result. This method is referred to as a "three register operand" method.

As an example of this method, the format of an instruction for operation among registers according to an MIPS architecture is shown in FIG. 1. The MIPS architecture is disclosed in "A quantative approach for design, realization and evaluation of a computer architecture" by David A. Patterson, John L. Hennessy (published by Nikkei BP in December 1992). In the MIPS architecture, machine code is of a 32-bit fixed length, and an instruction for operation among registers consists of the following fields: (from the MSB side) an instruction operation code 201 for indicating the type of instruction; a first source register number 202 for indicating a register which contains a first source operand; a second source register number 203 for indicating a register which contains a second source operand; a destination register number 204 for indicating a register which stores an operation result; a short constant 205 for indicating a small constant needed by some instructions; and an extension instruction operation code 206 that is an extension of an instruction operation code needed by some instructions. Note that bracketed numbers following respective field names in the drawing indicate the number of bits constituting respective fields.

As another example of the prior art, Cold RISC architecture has recently been made available. The Cold RISC architecture uses a shorter instruction achieved by reducing the code size of a basic instruction to thereby compress a program area. As a design example of such an architecture is Hitachi single-chip RISC microcomputer SH 7000 series, the format of an instruction for operation among registers used therein is shown in FIG. 2. In the SH7000 architecture, machine code is of a 16-bit fixed length, and an instruction for operation among registers consists of the following fields: (from the MSB side) a first instruction operation code 301 for indicating the type of instruction; a source register number 302 for indicating a register which contains a second source operand used in an operation; a destination register number 303 for indicating a register which stores an operation result, and contains a first source operand used in an operation; and a second instruction operation code 304 for indicating, in cooperation with the first instruction operation code, the type of instruction.

This method is significantly different from the above MIPS architecture in that one of the source operands needed in a binomial operation is extracted from the destination register. This method is referred to as a binomial register operand method.

A recently available processor employs a method to process instructions by overlapping them like a pipeline architecture, an adaptable construction thereof being shown in FIG. 3.

In the drawing, an instruction fetch section 401 receives the next instruction to be executed from an instruction cache 406 and outputs the obtained machine code to an instruction decode section 402. The instruction will be processed through the following procedure.

The instruction decode section 402 first separates the machine code into fields according to the type of instruction, and then extracts the following: an instruction operation code 411 for indicating the type of an operation to be processed, the immediate data 412 that is a constant operand embedded in the machine code, a first source register number 413, a second source register number 414, and a destination register number 415. Then, data of the registers in a register file 403 designated by the first and second source register numbers are read.

When the instruction operation code instructs execution of an operation such as an addition or subtraction operation, an operation execution section 404 executes the instructed operation according to the content read from source registers, so that the operation result 419 is stored in the register designated by the destination register number.

When the instruction operation code instructs storage in a memory, the operation execution section 404 computes a data memory address 416, so that data is written into a data cache 407 using the data memory address and write data 417.

When the instruction operation code instructs load from a memory, data is read from the data cache using the data memory address 416 generated by the operation execution section 404, so that the read data 419 is written into the register designated by the destination register number.

If the instruction cache or the data cache does not have a target machine code or data, machine code or data is transmitted from an external memory to the cache via an external memory interface 408.

The three register operand method is characterized in that it requires fewer execution instructions compared to the two register operand method. This is because an operation result always overwrites a source operand stored in one of the registers in the two register operand method. If data stored in a register is referred to by a plurality of instructions, the data may have to be copied to another register before executing operations. Taking as an example a function which executes a binomial operation using registers rs1 and rs2, and stores the operation result in a register rd will be described. In the case of the three register operand method, this function can be executed through one instruction, whereas it cannot using the two register operand method. In order to execute this function in the two register operand method, two instructions are necessary, namely, 1) an instruction for copying data in a register rs1 into a register rd, and 2) an instruction for executing a binomial operation op, for data in the registers rd and rs2 and storing the operation result in the register rd.

As described above, the three register operand method is effective in reducing the number of instructions, that is, the number of cycles to execute a program. However, this conventional method involves many problems in view of reduction of a program size because it causes a longer instruction length for each individual instruction.

Meanwhile, in the Cold RISC architecture, wherein a 16-bit machine code, for instance, is employed as a reference instruction to thereby reduce a program size, it is difficult to designate three registers as operands with a only single 16-bit instruction. In the case where sixteen general registers are provided, for instance, a 12-bit field is necessary to designate three registers as operands, which leaves only a 4-bit field available. However, it is difficult to store encoded data regarding the type of instruction or operation in the 4-bit field.

SUMMARY OF THE INVENTION

The present invention aims to solve the above problems, and therefore to provide an instruction construction method and a register designation method which allow flexible designation of many register operands using a shorter instruction length.

In order to achieve the above object, an instruction of the present invention comprises a plurality of register designation fields for explicitly designating one of the working registers, wherein at least one of the register designation fields is constructed smaller in size than the other register designation fields. More specifically, a data processing device of the present invention comprises $2^n$ registers, and executes an instruction which includes a register designation field having an n-bit width and a register designation field having an m-bit width, the m-bit width being narrower than the n-bit width. However, the number of registers which a register designation code incorporated into the m-bit register designation field can directly designate is no more than $2^m$ registers, which corresponds to a mere subset of the $2^n$ registers. The data processing device of the present invention comprises a register designation code conversion section which is capable of extending an m-bit register designation code into an n-bit register number.

Further, in the data processing device of the present invention, the code conversion section carries out a fixed code conversion such that identical inputs always cause generation of identical outputs.

Still further, in addition to the above, the data processing device of the present invention comprises a conversion table which holds $2^m$ register designation codes, each being m-bits long, wherein the code conversion section may be constructed such that one of the $2^m$ values held in the conversion table is selected in accordance with the m-bit register designation code and output. In addition, the conversion table may be constructed such that execution of an instruction by the data processing device will cause a part or all of the content of the conversion table to be updated.

The data processing device of the present invention may be provided with a section for executing a special instruction so as to explicitly update the content of the conversion table.

In another configuration of the present invention, the content of the conversion table is updated implicitly.

The present invention makes it possible to express a highly functional instruction in a shorter instruction length and to reduce a program size. Further, the present invention also provides an advantage that a program is executed at a higher speed through reduction of an instruction transmission rate at the time of program execution.

BRIEF DESCRIPTION OF THE DRAWINGS

The above and the other objects, features and advantages will be further apparent from the following description of the preferred embodiment taken in conjunction with the accompanying drawings wherein.

DESCRIPTION OF THE PREFERRED EMBODIMENTS

The present invention is characterized in that at least one of the instruction fields for designating a register operation has an n-bit width so as to allow designation of $2^n$ general registers and at least one of the instruction fields has an m-bit width so as to allow designation of $2^m$ general registers, m being smaller than n.

Figure 1:
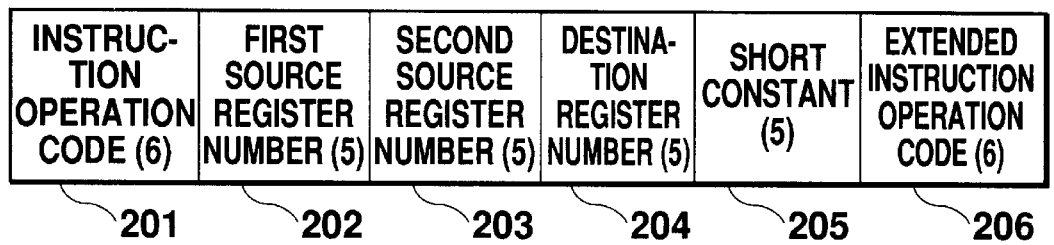
FIG. 1 shows an instruction format of an instruction for operation among registers used in a conventional data processing device employing an MIPS architecture.
Figure 2:
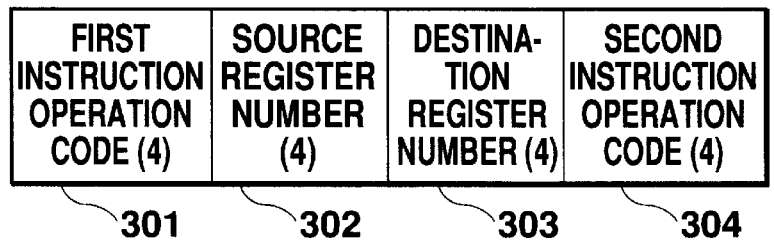
FIG. 2 shows an instruction format of an instruction for operation among registers used in a conventional data processing device employing an SH architecture.
Figure 3:
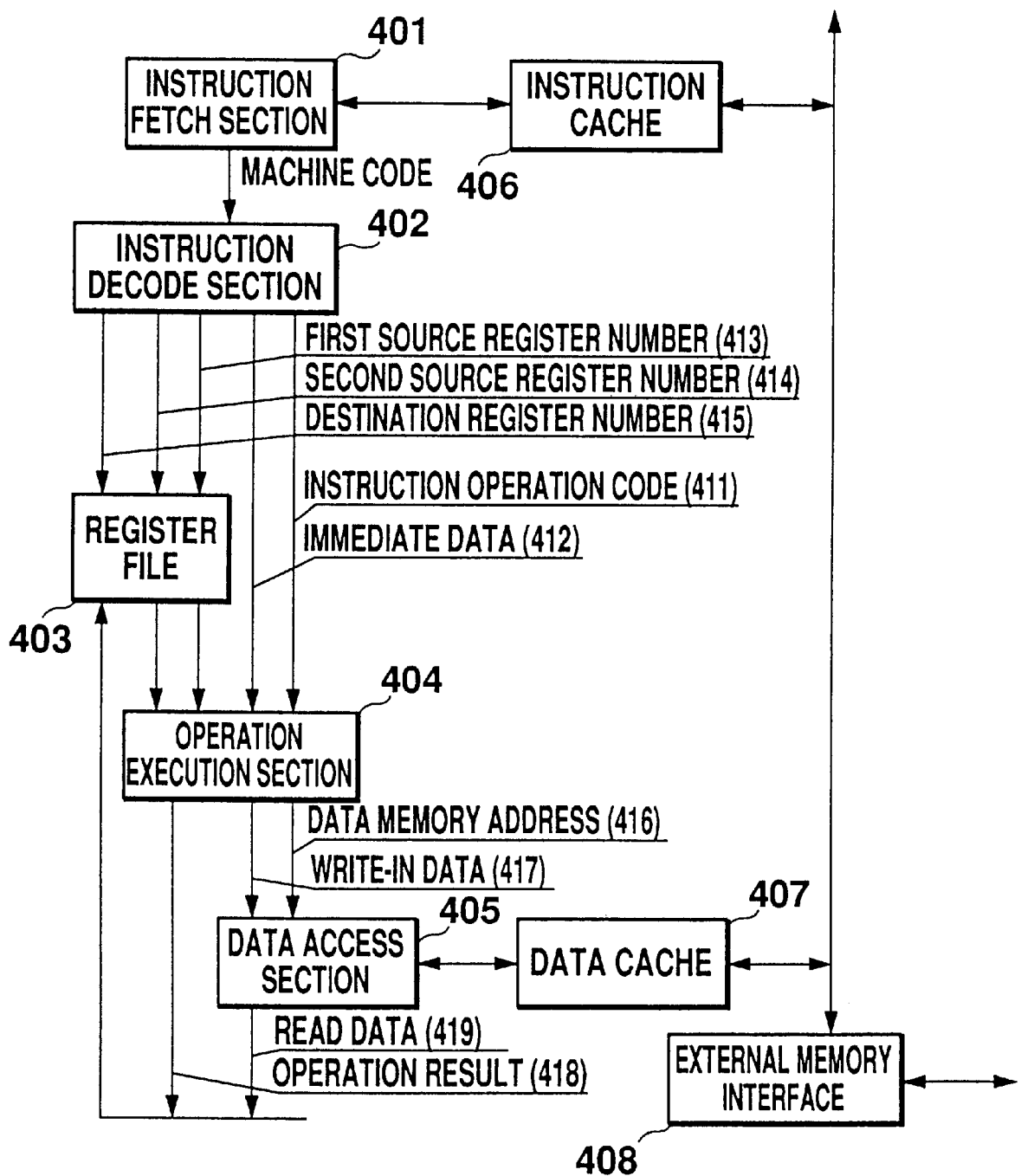
FIG. 3 is a representation showing an entire construction of a data processing device of the present invention.
Figure 4:
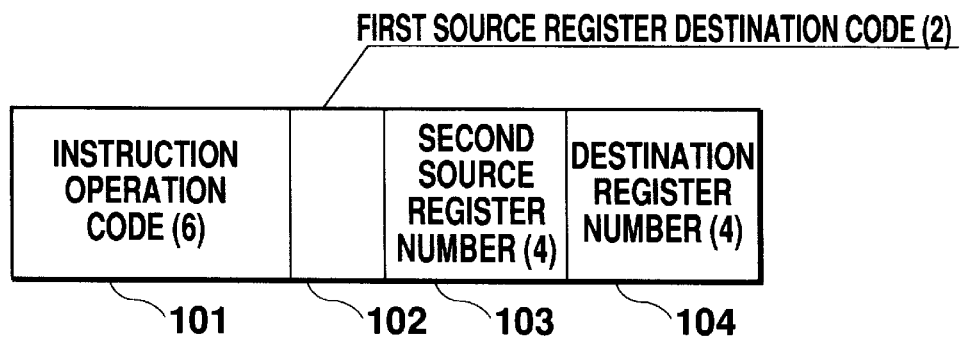
FIG. 4 shows an instruction format of an instruction for operation among registers used in a data processing device of the present invention.

FIG. 4 shows an instruction format of an instruction for operation among registers which is executed by a data processing device of a first embodiment of the present invention. In this embodiment, the data processing device 16 comprises sixteen general registers. An instruction for operation among registers consists of the following fields: (from the MSB side) an instruction operation code 101; a first source register designation code 102 of 2-bit width for designating a register which acts as a first source operand; a second source register designation code 103 of 4-bit width for designating a register which acts as a second source operand; and a destination register number 104 of 4-bit width for designating a register which stores an operation result.

Here, should a data processing device be provided with a function for selecting m registers out of n registers when it executes an instruction, it is possible to select any one of the n registers using a single instruction. Selection of m registers out of n registers can be achieved by using either of the following four methods.

In a first method, a group of registers which is designated by a first source register is fixed. That is, among sixteen registers r0 to r15, only registers r0 to r3 can be designated as a register containing a first source register operand.

In a second method, a group of registers which is designated by a first source register can be changed. The device has a function for managing information regarding a selection state of registers, that is, which registers have been selected to be designate by a first source register. Further, a special instruction for changing the selection state is added to the instruction set. More specifically, instructions are prepared for setting register numbers corresponding to four register designation codes designated by a 2-bit first source register designation code rs1, wherein the instructions are represented as (setrs1-01) and (setrs1-23). As a result of executing the following instructions, setrs1-01 r1, r3 setrs1-23 r8, r15, the register numbers r1, r3, r8 and r15 are set when the first source register designation code shows 0, 1, 2, and 3, respectively. This setting is valid until the next execution of instructions (setrs1-01) and (setrs1-23).

In the third method, similar to the second method, a group of registers which is designated by a first source register is dynamically managed. In this method, however, no special instruction is provided for an updating purpose of the selection state of registers, but the selection state is updated automatically when a normal operation instruction is executed. This is based on the experience that a register which was once used as a result of an instruction is quite likely to be used again for a closely following instruction. Various methods are available for updating subsets.

With m being two, one of the various methods employs identifiers CD, PD, PS1, and PS2 for four first source register designation codes, wherein CD means a destination register designated by the current instruction (current destination); PD means a destination register designated by the last executed operation instruction (previous destination); PS1 means the first source register designated by the last executed operation instruction (previous source 1); and PS2 means the second source register designated by the last executed operation instruction (previous source 2).

That is, the instructions add r3, CD, r4 sub r5, PS2, r6 are equivalent to the instructions add r3, r3, r4 sub r5, r4, r6, which are used in the three register operand designation method. Note that, in the above representation of instructions, the operands are shown for a destination register, a first source register, and a second source register in this sequence.

In the foregoing method, m is defined as 2. However, even if m is 1, the same method is applicable when providing a limitation of two identifiers, e.g., CD and PD. With m being 3, the same method is also applicable with an extension so as to designate four other registers, i.e. "a second source register designated by the current instruction," "a destination register designated by the last but two executed operation instruction," "a first source register designated by the last but two operation instruction," and "a second source register designated by the last but two executed operation instruction."

Another method is available for dynamically managing the selection state of registers, in which registers are updated in a least recently used (LRU) method. In this method, a list of register designation codes having a $2^m$ length is managed so as to store recently used registers. With m=2, assume that the following instructions are executed. The contents of conceptual register lists immediately after the execution of respective instructions are shown on the right side of the semicolon below. Further, identifiers L1 to L4 are used for first source register destination codes, by which a designated register is indicated. The register corresponding to L4 is the last used register, and those corresponding to L3 to L1 are last but one, two, and three used registers, respectively. Thus, when another register is used to execute another instruction, the register r0 corresponding to L1 is removed from the list, and the register r1 corresponding to L2 is shifted leftward to be a register corresponding to L1 instead.

In this manner, registers are subsequently shifted leftward in the register list.

|     |      |     |     |   | L1   | L2   | L3   | L4   |
|-----|------|-----|-----|---|------|------|------|------|
|     |      |     |     | ; | (r0, | r1,  | r2,  | r3): |
|     |      |     |     |   | list at an initial state | | | |
| add | r8,  | L1, | r9  | ; | (r3, | r8,  | r0,  | r9)  |
| sub | r9,  | L4, | r10 | ; | (r8, | r0,  | r9,  | r10) |
| add | r11, | L3, | r9  | ; | (r0, | r10, | r11, | r9)  |
| sub | r10, | L4, | r10 | ; | (r0, | r11, | r9,  | r10) |

As indicated above, upon the first add instruction, three registers r8, L1, and r9 are used. L1 indicates the register corresponding to L1 in the list at the initial state, i.e. r0 in this example. After executing this add instruction, registers r8, r0 and r9 then become the latest used three registers. Thus, those three registers r8, r0, and r9 are now included in the list as the three on the right which correspond to L2 to L4. In addition, r3 which corresponded to L4 in the list at the initial state has been shifted to then correspond to L1. In this manner, registers which are used upon subsequent instructions are successively included in the list starting at the rightmost one corresponding to L4. If the same register is included in the list a plurality of times, only the last one is left therein, eliminating the previous one(s).

The above instructions are equivalent to the following used in the three register operand designation method.

|     |      |     |     |
|-----|------|-----|-----|
| add | r8,  | r0, | r9  |
| sub | r9,  | r9, | r10 |
| add | r11, | r9, | r9  |
| sub | r10, | r9, | r10 |

In the above example, m is defined as 2 for convenience in a concrete explanation, though the same method is applicable with m being a different value.

The following describes how the above instruction set architecture is actually realized in hardware.

Figure 5:
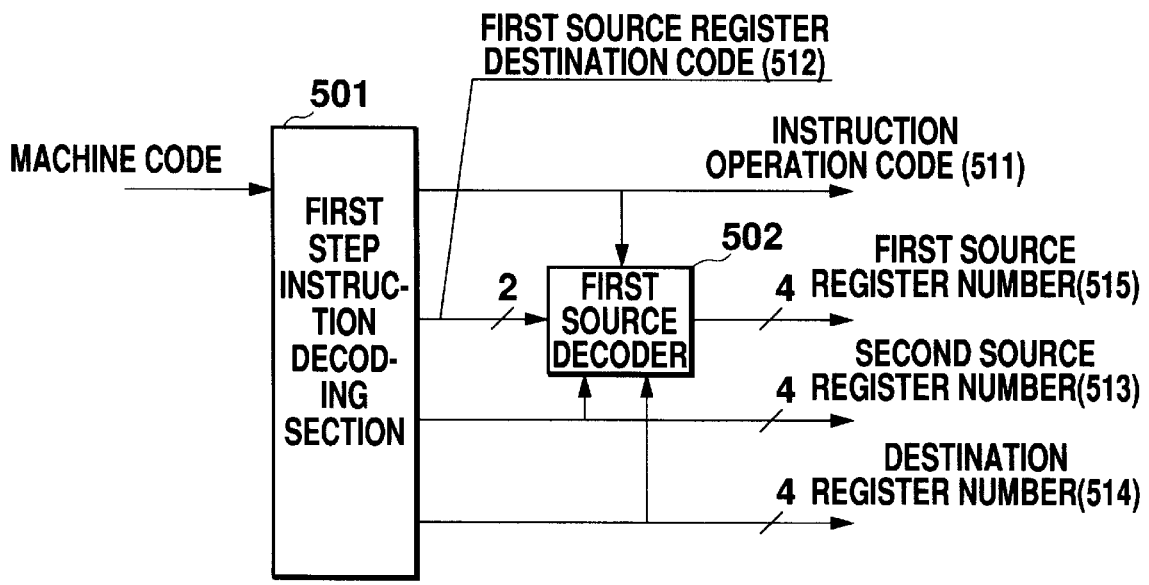
FIG. 5 shows a construction of an instruction decoding section of a data processing device of the present invention.

As is obvious from the foregoing description, the present invention is characterized in that an encoded reduced register designation field having a shorter m-bit length is converted to have a longer n-bit length statically or dynamically. A hardware construction varies depending on the conversion method applied. FIG. 5 shows a construction of an instruction decoder for executing respective methods of the present invention. This decoder construction, designed on the assumption that m=2 and n=4, corresponds to an instruction format shown in FIG. 4.

In operation, an instruction fetching section outputs machine code, from which the first step instruction decoding section 501 extracts an instruction operation code 511, a first source register designation code 512, a second source register number 513, and a destination register number 514. The 2-bit first source register designation code 512 is converted into a 4-bit first source register number 515 by the first source decoder 502 which acts as a designation code conversion means of the present invention.

Figure 6:
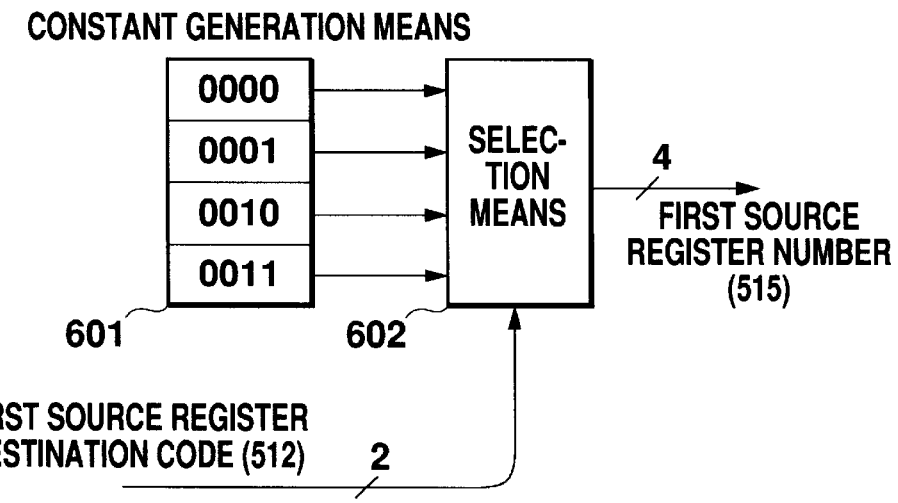
FIG. 6 is a detailed representation showing the construction of a first source decoder of FIG. 5.

FIG. 6 is a detailed representation showing the construction of a first source decoder for executing the above first method, which comprises a selection means. The selection means selects one of the four constants generated by a constant generation means 601 according to the first source register designation code which has been extracted from the instruction code before decoding. The selection result is defined as a first source register number.

Figure 7:
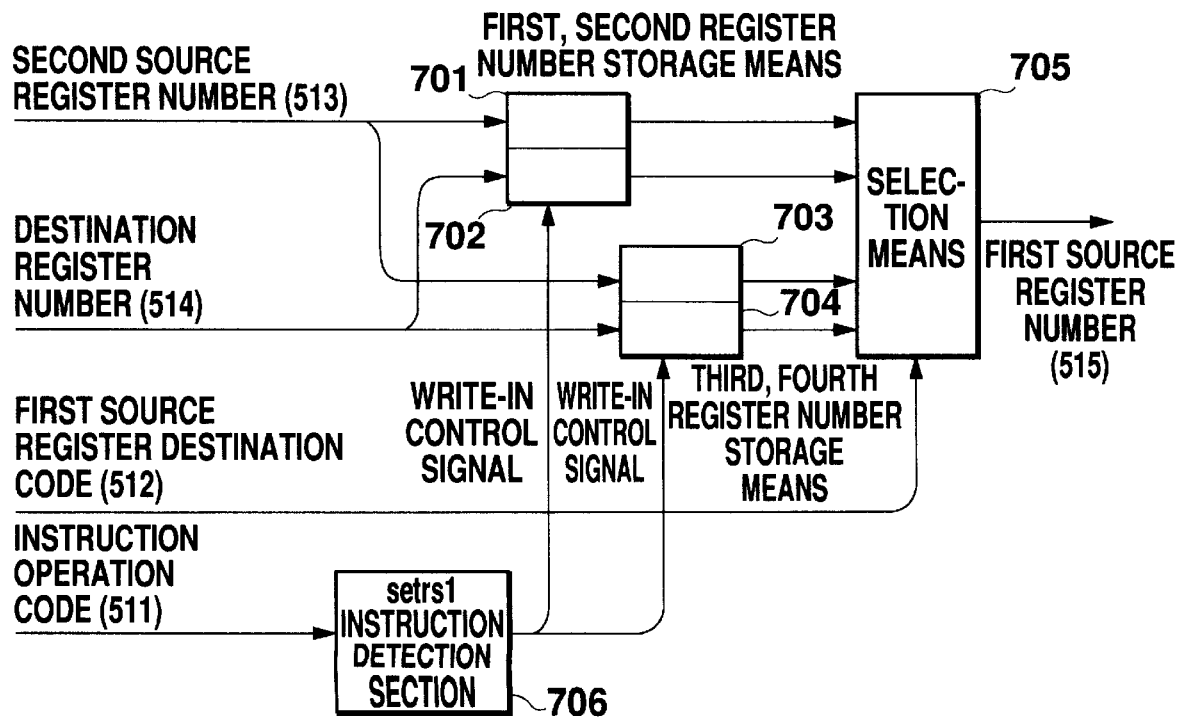
FIG. 7 is a detailed representation showing the construction of a first source decoder of FIG. 5.

FIG. 7 is a detailed representation showing the construction of a first source decoder for executing the above second method, which comprises a conversion table. The conversion table includes four register number storage means 701, 702, 703, 704, and selection means 705 for selecting one of the four register number storage means according to the first source register designation code. The first source decoder of FIG. 7 further comprises a setrs1-instruction detection section 706 for controlling execution of instructions (setrs1-01) and (setrs1-23) according to the instruction operation code. Among the four register number storage means, the first and second register number storage means 701, 702 contain values of the second source register number field and the destination register number field within machine code, and a control signal which is to be asserted when executing an instruction (setrs1-01), the content of the registers being re-written upon the instruction (setrs1-01). In addition, the third and fourth register number storage means 703, 704 contain a control signal which is to be asserted when executing an instruction (setrs1-23) held therein, the content of the registers being re-written upon the instruction (setrs1-23).

Figure 8:
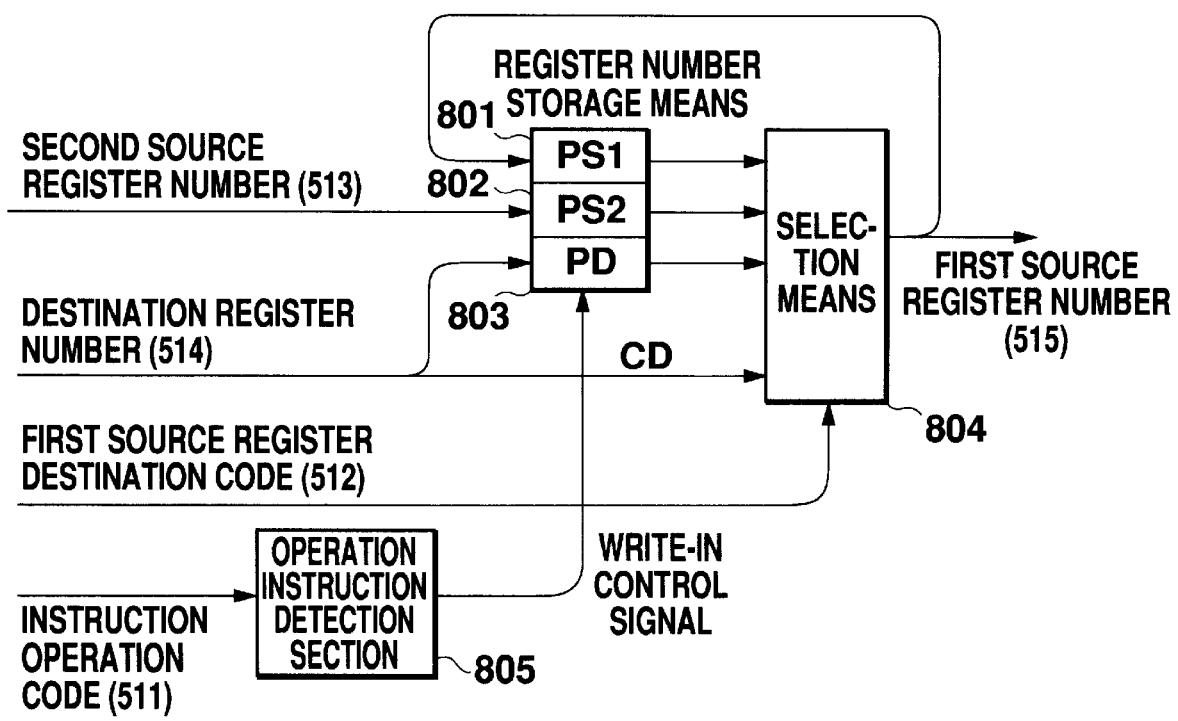
FIG. 8 is a detailed representation showing the construction of a first source decoder of FIG. 5.

FIG. 8 is a detailed representation showing the construction of the first source decoder for executing the above third method, which comprises three register number storage means; namely, a PS1 register number storage means 801 for storing first source register number of the last executed operation instruction; a PS2 register number storage means 802 for storing the second source register number of the last executed operation instruction; and a PD register number storage means 803 for storing the destination register number of the last executed operation instruction. This first source decoder further comprises selection means 804 for selecting four values according to the first source register designation code before decoding, the four values consisting of values held in the three register designation code storage means and a destination register number (CD) contained in a machine code in the course of execution. The selected numbers are transmitted to a register file and to the PS1 register number storage means 801 to be used for decoding the first register designation code of the next operation instruction. Further, the three register designation code storage means are input with a write-in control signal from the operation instruction detection section 805 which detects execution of an operation instruction according to an instruction operation code, the values held in the means being updated only upon execution of an operation instruction. This update is carried out after a first source register number is output to a register file via the selection means.

What is claimed is:

1. A data processing device having a plurality of working registers and employing a stored program method, comprising:
    an instruction fetch section for fetching machine code, the machine code including an instruction operation code, at least one register number consisting of a typical number of bits capable of identifying and designating each of the working registers, for explicitly designating one of the working registers, and at least one register designation code consisting of less than the typical number of bits capable of identifying and designating a fewer number of working registers than the plurality of working registers; and
    a register designation code conversion section for converting the register designation code into a register number having the typical number of bits for designating one of the working registers,
    wherein the machine code enables a shorter instruction and a smaller program size using a plurality of working resisters.

2. A data processing device according to claim 1, wherein the register designation code conversion section converts the register designation code into a register number with fixed correspondence, irrespective of a state of the data processing device.

3. A data processing device according to claim 2, wherein the register designation code conversion section includes a constant generation section for generating a plurality of constants corresponding to register numbers, and a selection section for selecting one constant from the plurality of constants generated based on the register designation code, and converts the register designation code into a register number with fixed correspondence.

4. A data processing device according to claim 2, wherein a group of registers available for being designated by said register designation code are statically fixed.

5. A data processing device according to claim 1, wherein the register designation code conversion section includes
    a conversion table for holding a corresponding relationship between a register designation code and a register number, and
    a conversion table updating section for updating the conversion table when the data processing device executes an instruction.

6. A data processing device according to claim 5, wherein the conversion table updating section identifies an instruction operation code and updates the conversion table when executing a special instruction for updating the conversion table.

7. A data processing device according to claim 6, wherein the conversion table updating section includes a special instruction detection section for writing a new register number in the conversion table so that the register designation code is able to be converted into a different register number upon detection of the special instruction.

8. A data processing device according to claim 5, wherein the conversion table updating section identifies an instruction operation code and, when executing a normal instruction, updates the conversion table using a register number or a register designation code contained in the instruction.

9. A data processing device according to claim 8, wherein the conversion table updating section updates the conversion table, when executing a given instruction, such that a register used upon instructions executed prior to and closely to the given instruction becomes usable by a register designation code contained in the given instruction.

10. A data processing device according to claim 9, wherein the conversion table updating section updates the conversion table, when executing a given instruction, such that any of a source register or a destination register which was used upon instructions executed immediately prior to the given instruction becomes usable by a register designation code contained in the given instruction.

11. A data processing device according to claim 9, wherein the conversion table updating section employs a "least recently used" method as a method for registering and/or deleting a register number which is made usable by a register designation code, for updating the conversion table.

12. A data processing device according to claim 8, wherein said register designation code is a code representative of a destination register designated by the current instruction, a code representative of a destination register designated by the last executed operation instruction, a code representative of a first source register designated by the last executed operation instruction, or a code representative of a second source register designated by the last executed operation instruction.

13. A data processing device according to claim 8, wherein said register designation code is a code representative of a designation register designated by the current instruction, a code representative of a destination register designated by the last executed normal instruction, a code representative of a first source register designated by the last executed normal instruction, or a code representative of a second source register designated by the last executed normal instruction.

14. A data processing device according to claim 8, wherein said register designation code is a code representative of a destination register designated by the current instruction, a code representative of a destination register designated by the last executed normal instruction, a code representative of a destination register designated by a normal instruction executed immediately prior to the last executed normal instruction, or a code representative of a destination register designated by a normal instruction executed immediately prior to the normal instruction executed immediately prior to the last executed normal instruction.

15. A data processing device according to claim 8, wherein said register designation code is a code representative of a destination register designated by the current instruction, a code representative of a destination register designated by the last executed operation instruction, a code representative of a destination register designated by an operation instruction executed immediately prior to the last executed operation instruction, or a code representative of a destination register designated by an operation instruction executed immediately prior to the operation instruction executed immediately prior to the last executed operation instruction.

16. A data processing device according to claim 1, wherein said typical number of bits is four bits, and said register designation code consists of two bits.

* * * * *